United States Patent
Davian

(10) Patent No.: US 6,179,360 B1
(45) Date of Patent: Jan. 30, 2001

(54) TAILGATE ATTACHMENT

(76) Inventor: Joshua M. Davian, 381 Grunion Ct., Foster City, CA (US) 94404

( * ) Notice: Under 35 U.S.C. 154(b), the term of this patent shall be extended for 0 days.

(21) Appl. No.: 09/176,831

(22) Filed: Oct. 22, 1998

(51) Int. Cl.[7] .................. B62D 33/023; B62D 33/037; B62D 33/08; B60P 1/267; B60P 1/273
(52) U.S. Cl. .................. 296/50; 296/55; 296/26.08; 296/26.11
(58) Field of Search .............. 296/50, 55, 57.1, 296/26.01, 26.02, 26.03, 26.04, 26.05, 26.06, 26.07, 26.08, 26.11

(56) References Cited

U.S. PATENT DOCUMENTS

| | | | |
|---|---|---|---|
| 4,531,773 | * | 7/1985 | Smith ............................ 296/26.11 |
| 5,114,203 | * | 5/1992 | Carnes .............................. 296/50 |
| 5,501,500 | * | 3/1996 | Cannon ........................... 296/26.08 |
| 5,735,565 | * | 4/1998 | Papai et al. ...................... 296/26.04 |
| 5,775,759 | * | 7/1998 | Cummins ......................... 296/26.11 |
| 5,788,311 | * | 8/1998 | Tibbals ............................ 296/26.11 |

* cited by examiner

*Primary Examiner*—D. Glenn Dayoan
*Assistant Examiner*—Greg Blankenship

(57) ABSTRACT

A tailgate attachment for extending the cargo space of a load bed of a vehicle includes a back panel pivotally coupled to a bottom panel. The bottom panel is designed for resting on a tailgate of a load bed of a vehicle. First and second side panels are pivotally coupled to the back panel. Each of the side panels is designed for detachable attachment to an adjacent side wall of a vehicle when the tailgate of the vehicle is generally horizontal.

7 Claims, 2 Drawing Sheets

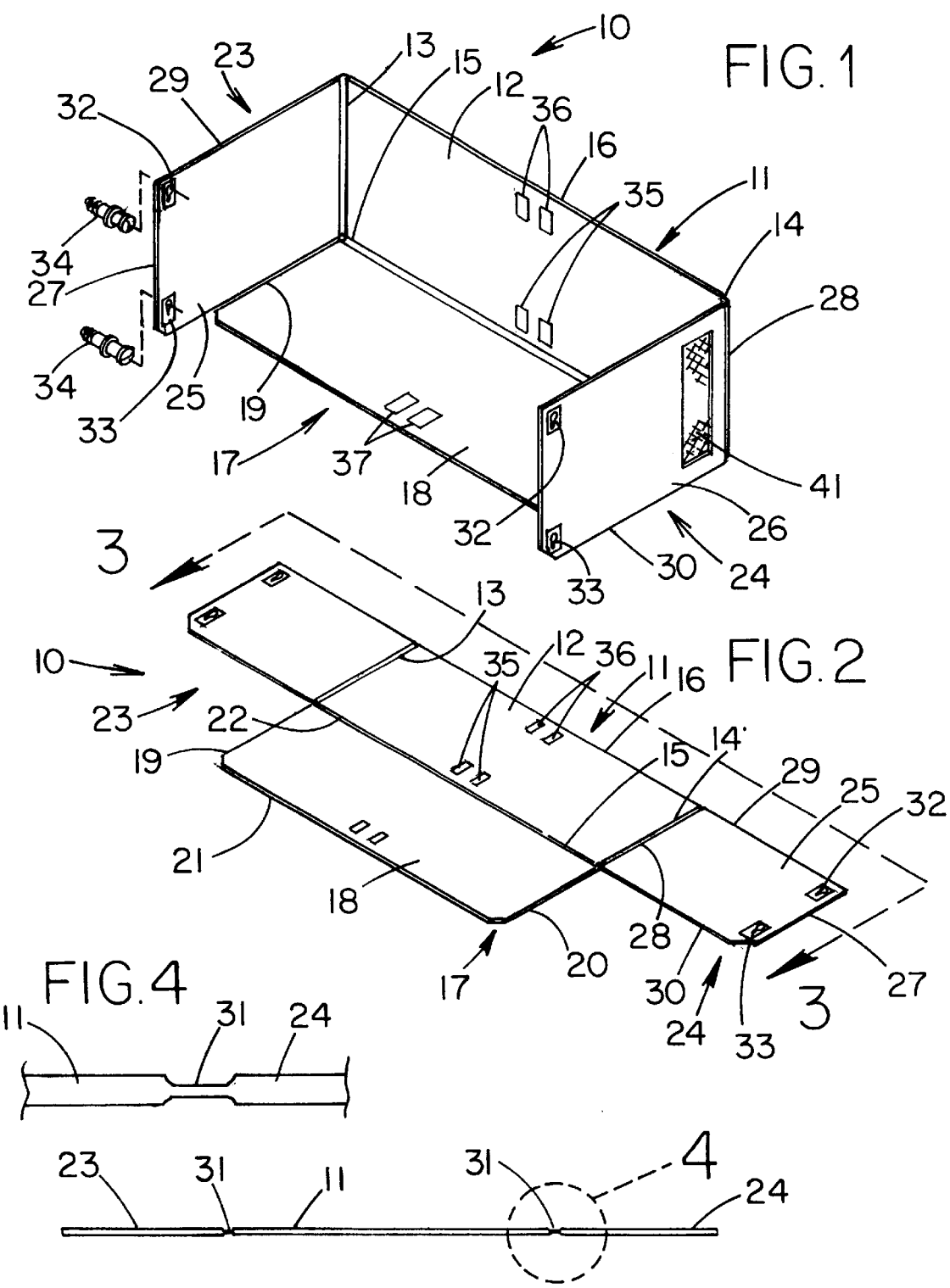

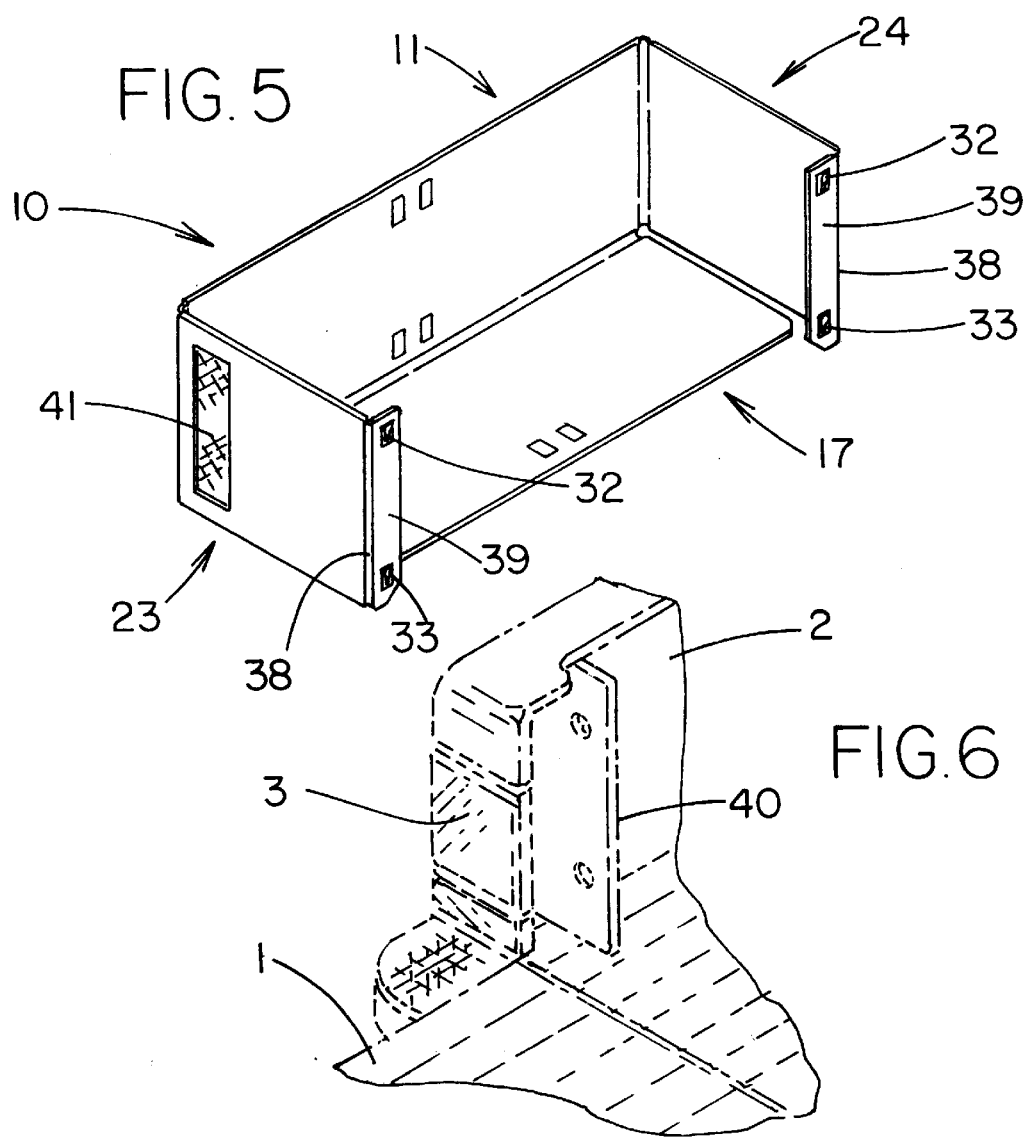
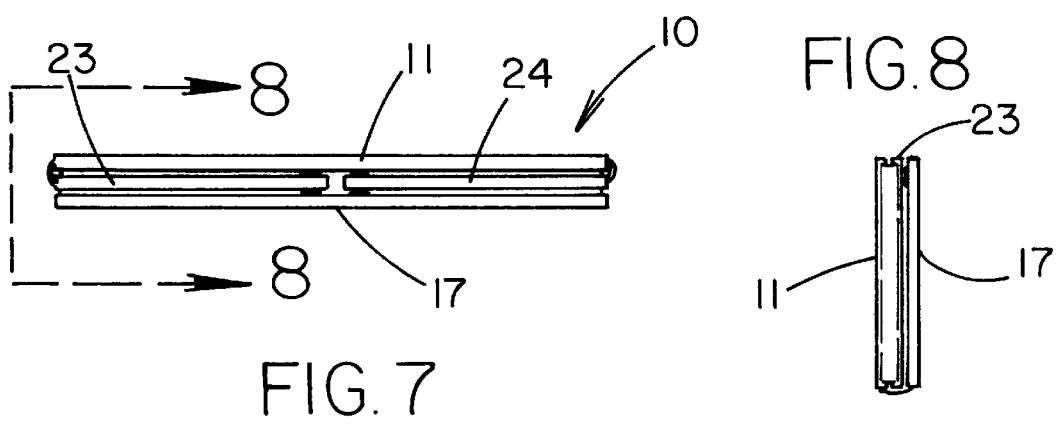

TAILGATE ATTACHMENT

BACKGROUND OF THE INVENTION

1. Field of the Invention

The present invention relates to tailgate attachments and more particularly pertains to a new tailgate attachment for extending the cargo space of a load bed of a vehicle.

2. Description of the Prior Art

The use of tailgate attachments is known in the prior art. More specifically, tailgate attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,472,639; U.S. Pat. No. 5,154,470; U.S. Pat. No. Des. 327,044; U.S. Pat. No. 4,023,850; U.S. Pat. No. 4,778,213; and U.S. Pat. No. 4,531,773.

While these devices fulfill their respective, particular objectives and requirements, the aforementioned patents do not disclose a new tailgate attachment. The inventive device includes a back panel pivotally coupled to a bottom panel. The bottom panel is designed for resting on a tailgate of a load bed of a vehicle. First and second side panels are pivotally coupled to the back panel. Each of the side panels is designed for detachable attachment to an adjacent side wall of a vehicle when the tailgate of the vehicle is generally horizontal.

In these respects, the tailgate attachment according to the present invention substantially departs from the conventional concepts and designs of the prior art, and in so doing provides an apparatus primarily developed for the purpose of extending the cargo space of a load bed of a vehicle.

SUMMARY OF THE INVENTION

In view of the foregoing disadvantages inherent in the known types of tailgate attachments now present in the prior art, the present invention provides a new tailgate attachment construction wherein the same can be utilized for extending the cargo space of a load bed of a vehicle.

The general purpose of the present invention, which will be described subsequently in greater detail, is to provide a new tailgate attachment apparatus and method which has many of the advantages of the tailgate attachments mentioned heretofore and many novel features that result in a new tailgate attachment which is not anticipated, rendered obvious, suggested, or even implied by any of the prior art tailgate attachments, either alone or in any combination thereof.

To attain this, the present invention generally comprises a back panel pivotally coupled to a bottom panel. The bottom panel is designed for resting on a tailgate of a load bed of a vehicle. First and second side panels are pivotally coupled to the back panel. Each of the side panels is designed for detachable attachment to an adjacent side wall of a vehicle when the tailgate of the vehicle is generally horizontal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the general public, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tailgate attachment apparatus and method which has many of the advantages of the tailgate attachments mentioned heretofore and many novel features that result in a new tailgate attachment which is not anticipated, rendered obvious, suggested, or even implied by any of the prior art tailgate attachments, either alone or in any combination thereof.

It is another object of the present invention to provide a new tailgate attachment which may be easily and efficiently manufactured and marketed.

It is a further object of the present invention to provide a new tailgate attachment which is of a durable and reliable construction.

An even further object of the present invention is to provide a new tailgate attachment which is susceptible of a low cost of manufacture with regard to both materials and labor, and which accordingly is then susceptible of low prices of sale to the consuming public, thereby making such tailgate attachment economically available to the buying public.

Still yet another object of the present invention is to provide a new tailgate attachment which provides in the apparatuses and methods of the prior art some of the advantages thereof, while simultaneously overcoming some of the disadvantages normally associated therewith.

Still another object of the present invention is to provide a new tailgate attachment for extending the cargo space of a load bed of a vehicle.

Yet another object of the present invention is to provide a new tailgate attachment which includes a back panel pivotally coupled to a bottom panel. The bottom panel is designed for resting on a tailgate of a load bed of a vehicle. First and second side panels are pivotally coupled to the back panel. Each of the side panels is designed for detachable attachment to an adjacent side wall of a vehicle when the tailgate of the vehicle is generally horizontal.

Still yet an other object of the present invention is to provide a new tailgate attachment that may be folded down when not in use so that the tailgate of the vehicle may be pivoted to its vertical closed position.

Even still another object of the present invention is to provide a new tailgate attachment that helps prevent items on the load bed of the vehicle from falling out of the load bed when the tailgate is in its horizontal lowered position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new tailgate attachment according to the present invention with the back panel in the raised position and the side panels is their deployed positions.

FIG. 2 is a schematic perspective view of the present invention with all the panels laid out flat.

FIG. 3 is a schematic side view of the present invention taken from line 3—3 of FIG. 2.

FIG. 4 is a schematic partial side view of a living binge of the present invention taken from region of circle 4 on FIG. 3.

FIG. 5 is a schematic perspective view of an optional preferred embodiment of the present invention having flap regions.

FIG. 6 is a schematic perspective view of mounting plate for use with the embodiment of the present invention illustrated in FIG. 5.

FIG. 7 is a schematic side view of the present invention folded up with the back panel in the lowered position and the side panels in their folded positions.

FIG. 8 is a schematic side view of the folded present invention taken from the vantage of line 8—8 of FIG. 7.

DESCRIPTION OF THE PREFERRED EMBODIMENT

With reference now to the drawings, and in particular to FIGS. 1 through 8 thereof, a new tailgate attachment embodying the principles and concepts of the present invention and generally designated by the reference numeral 10 will be described.

The tailgate attachment 10 is designed for attaching to a generally rectangular tailgate 1 pivotally coupled to the rear of a load bed of a vehicle. The load bed of the vehicle has a pair of upwardly extending and spaced apart side walls 2 each having a tail light end 3 positioned adjacent the tailgate 1. As best illustrated in FIGS. 1 through 8, the tailgate attachment 10 generally comprises a back panel 11 pivotally coupled to a bottom panel 17. The bottom panel 17 is designed for resting on a tailgate 1 of a load bed of a vehicle. First and second side panels 23,24 are pivotally coupled to the back panel 11. Each of the side panels 23,24 is designed for detachable attachment to an adjacent side wall 2 of a vehicle when the tailgate 1 of the vehicle is generally horizontal.

In closer detail, the back panel 11 is generally rectangular and has generally flat first and second faces, a generally straight pair of ends 13,14, and a generally straight pair of sides 15,16 extending between the ends 13,14 of the back panel 11. The back panel 11 has a length defined between the ends of the back panel and a width defined between the sides of the back panel. Preferably, the length of the panel is sized to extend across the width of a tailgate 1 and the width of the back panel is sized to extend across the distance between a load bed and the upper edges of the side walls of the load bed such that one of the sides 16 of the back panel 11 lies in a common plane with the upper edges of the side walls 2 when the back panel 11 is vertically resting on the tailgate 1. In an ideal illustrative embodiment, the length of the back panel 11 is about 5 feet and the width of the back panel 11 is about 2½ feet.

The bottom panel 17 is generally rectangular and has generally flat top and bottom faces, a generally straight pair of ends 19,20 and a generally straight front and back sides 21,22 extending between the ends 19,20 of the bottom panel 17. The bottom panel 17 has a length defined between the ends of the bottom panel and a width defined between the front and back sides 21,22 of the bottom panel 17. Preferably, the length of the bottom panel 17 is about equal to the length of the back panel 11 and the width of the bottom panel 17 is about equal to the width of the back panel 11.

A first side 15 of the pair of sides of the back panel 11 is pivotally coupled to the back side 22 of the bottom panel 17. Preferably, a living hinge pivotally couples the first side of the back panel 11 to the back side 22 of the bottom panel 17. An example of a living hinge 31 is illustrated in FIG. 4. Each end of the back panel is associated with an end of the bottom panel. Each pair of associated ends of the back and bottom panel 17 generally lie in a common plane. The common planes of the pairs of associated ends of the back and bottom panels are generally parallel to one another.

In use, the bottom face of the bottom panel is designed for resting on a tailgate 1 of a load bed of a vehicle such that the front side 21 of the bottom panel 17 is positioned towards the load bed of the vehicle. The back panel 11 is pivotable between a lowered position and a raised position with respect to the bottom panel 17. The first face 12 of the back panel 11 is positioned adjacent the top face 18 of the bottom panel 17 such that the back panel 11 and the bottom panel 17 generally lie in parallel planes when the back panel 11 is in the lowered position. The back panel 11 and the tailgate 1 lie in generally parallel planes when the back panel 11 is in the lowered position and the bottom face of the bottom panel 17 is resting on the tailgate 1. Similarly, the back panel 11 and the bottom panel 17 generally lie in perpendicular planes when the back panel 11 is in the raised position. The back panel 11 and the tailgate 1 lie in generally perpendicular planes when the back panel 11 is in the raised position and the bottom face of the bottom panel 17 is resting on the tailgate 1.

First and second side panels 23,24. Each side panel is generally rectangular and has generally flat inner and outer faces 25,26, generally straight front and back ends 27,28, and upper and lower sides 29,30 extending between the front and back ends 27,28 of the respective side panel. The first and second side panels 23,24 each have a length defined between the front and back ends 27,28 of the respective side panel and a width defined between the upper and lower ends of the respective side panel. Preferably, the lengths of the first and second side panels 23,24 are generally equal to one another and the widths of the first and second side panels 23,24 are generally equal to one another. Ideally, the length of each of the side panels 23,24 is greater than the width of the bottom panel 17 and the sum of the lengths of the side panels 23,24 is less than about the length of the back panel 11.

The back end of the first side panel is pivotally coupled to a first end 13 of the pair of ends of the back panel 11 and the back end of the second side panel is pivotally coupled to a second end 14 of the pair of ends of the back panel 11. Preferably, a living hinge pivotally couples each back end 28 of the side panels 23,24 to the associated end of the back panel 11. In use, the side panels 23,24 are each pivotable between a folded position and a deployed position. The side panels 23,24 generally lie in parallel planes to the back panel 11 when the side panels 23,24 are in the folded position. The side panels 23,24 generally lie in perpendicular planes to the back panel 11 when the side panels 23,24 are in the deployed position. The inner faces of the side panels 23,24 generally facing one another when the side panels 23,24 are in the deployed position. The inner faces of the side panels 23,24 generally face the first face 12 of the back panel 11 when the side panels 23,24 are in the folded position.

In use, each of the side panels 23,24 is designed for detachable attachment to an adjacent side wall 2 of a vehicle when the tailgate 1 of the vehicle is generally horizontal, the back panel 11 is in the raised position, and the side panels 23,24 are in the deployed position. Preferably, each of the side panels 23,24 has a pair of keyhole grommets 32,33 each with a keyhole through the respective side panel between the inner and outer faces 25,26 of the respective side panel. The keyhole grommets 32,33 each comprise a magnetizable metal material. The keyhole grommets 32,33 are positioned towards the front end 27 of the respective side panel. One keyhole grommet of each side panel is positioned adjacent the upper side of the respective side panel, another keyhole grommet 32,33 of each side panel is positioned adjacent the lower side of the respective side panel. In use, each keyhole grommet 32,33 is designed for extending a fastener 34 therethrough the keyhole for securing the side panels 23,24 to the side walls 2 of the vehicle. The fasteners 34 are removable from the associated keyhole grommet 32,33 to permit folding of the side panels 23,24 to the folded position. The fasteners 34 may be permanently affixed to the side walls 2 of the vehicle or they may be threaded fasteners 34 which are removable from the side walls 2 of the vehicle.

The first face 12 of the back panel 11 has first and second pairs of magnets 35,36 thereon. The first pair of magnets 35 of the back panel 11 is positioned towards the first side of the back panel 11. The second pair of magnets 36 of the back panel 11 is positioned towards a second side of the pair of sides of the back panel 11. The top face 18 of the bottom panel 17 also has a pair of magnets positioned adjacent the front side 21 of the bottom panel 17. The first pair of magnets 35 of the back panel 11 is magnetically attachable to the keyhole grommets 32,33 of the side panels 23,24 adjacent the lower sides 30 of the side panels 23,24 when the side panels 23,24 are in the folded position to magnetically bold the side panels 23,24 to the back panel 11. The second pair of magnets 36 of the back panel 11 is magnetically attachable to the keyhole grommets 32,33 of the side panels 23, 4 adjacent the upper sides 29 of the side panels 23,24 when the side panels 23,24 are in the folded position to magnetically hold the side panels 23,24 to the back panel 11. The pair of magnets 37 of the bottom panel 17 is magnetically attachable to the keyhole grommets 32,33 of the side panels 23,24 adjacent the upper sides 29 of the side panels 23,24 when the side panels 23,24 are in the folded position and the back panel 11 is in the lowered position to magnetically hold the side panels 23,24 to the bottom panel 17.

In an optional embodiment, as illustrated in FIG. 5, each of the side panels 23,24 has a fold 38 extending between the upper and lower sides 29,30 of the respective side panel generally parallel to the front end 27 of the respective side panel. The fold 38 and front end 27 of each side panel define a flap region 39 therebetween. The keyhole grommets 32,33 are located in the flap regions 39. In use, the flap regions 39 are pivotable along the associated fold 38 with respect to the remainder of the respective side panel. The flap regions 39 is designed for abutting against a pair of opposing mounting plate 40s on the side walls 2 of the vehicle to permit extension of fasteners 34 through the keyhole grommets 32,33 and the mounting plate 40 to secure the side panels 23,24 to the side walls 2 of the vehicle.

Ideally, each of the side panels 23,24 has a beveled lower corner adjacent the front end 27 and lower side 30 of the respective corner and the bottom panel 17 has a pair of beveled corners adjacent the front side 21 of the bottom panel 17, the beveled corners is for preventing items on the load bed from catching on the exposed corners of the attachment especially when removing items from the load bed.

Preferably, the outer face 26 of each of the side panels 23,24 has a reflector 41 thereon adjacent the back panel 11. The reflectors 41 each have a generally rectangular configuration. Ideally, the reflectors 41 are recessed into the outer face 26 of the respective side panel so that the reflectors 41 do not hinder folding of the attachment.

In use, the attachment helps increase the cargo space of the load bed when the bottom panel rests of the tailgate and the back panel is in the raised position and the side panels are in their deployed positions and attached to the side walls of the load bed. This positioning of the attachment also prevents items on the load bed from fall off of the tailgate. When the tailgate is raised to its closed position, the back and side panels may be folded to their lowered and folded positions so that the attachment does not occupy a large space of the load bed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachment for attaching to a tailgate pivotally coupled to a load bed of a vehicle, the load bed of the vehicle having a pair of upwardly extending and spaced apart side walls each having a tail light end positioned adjacent the tailgate, the attachment comprising:

a back panel having first and second faces, a pair of ends, and a pair of sides extending between said ends of said back panel;

a bottom panel having top and bottom faces, a pair of ends and front and back sides extending between said ends of said bottom panel;

a first side of said pair of sides of said back panel being pivotally coupled to said back side of said bottom panel;

said bottom face of said bottom panel being adapted for resting on a tailgate of a load bed of a vehicle such that said front side of said bottom panel is positioned towards the load bed of the vehicle;

first and second side panels, each side panel having inner and outer faces, front and back ends, and upper and lower sides extending between said front and back ends of the respective side panel;

said back end of said first side panel being pivotally coupled to a first end of said pair of ends of said back panel, said back end of said second side panel being pivotally coupled to a second end of said pair of ends of said back panel;

each of said side panels being adapted for detachable attachment to an adjacent side wall of a vehicle when the tailgate of the vehicle is generally horizontal;

wherein said outer face of each of said side panels has a reflector thereon adjacent said back panel for providing visual identification of said side panels in low visibility conditions, said reflectors being recessed into the outer face of the respective side panel such that said reflectors do not hinder folding of said side panels;

wherein each of said side panels has a pair of keyhole grommets, each keyhole grommet having a keyhole through the respective side panel between said inner and outer faces of the respective side panel, said keyhole grommets being positioned towards the front end of the respective side panel, one keyhole grommet of each side panel being positioned adjacent said upper side of the respective side panel, another keyhole grommet of each side panel being positioned adjacent said lower side of the respective side panel, each keyhole grommet being adapted for extending a fastener therethrough for securing the side panels to the side walls of the vehicle; and wherein said keyhole grommets each comprise a magnetizable metal material.

2. The attachment of claim 1, wherein said back panel has a length defined between said ends of said back panel and a width defined between said sides of said back panel, wherein said bottom panel has a length defined between said ends of said bottom panel and a width defined between said front and back sides of said bottom panel, and wherein said length of said bottom panel is about equal to said length of said back panel, and wherein said width of said bottom panel is about equal to said width of said back panel.

3. The attachment of claim 2, wherein said first and second side panels each having a length defined between the front and back ends of the respective side panel and a width defined between the upper and lower ends of the respective side panel, wherein said lengths of said first and second side panels are generally equal to one another and said widths of said first and second side panels are generally equal to one another, and wherein said length of each of said side panels is greater than said width of said bottom panel, wherein the sum of said lengths of said side panels is less than about said length of said back panel.

4. The attachment of claim 1, wherein said first face of said back panel has first and second pairs of magnets, said first pair of magnets of said back panel being positioned towards said first side of said back panel, said second pair of magnets of said back panel being positioned towards a second side of said pair of sides of said back panel, wherein said top face of said bottom panel has a pair of magnets positioned adjacent said front side of said bottom panel, wherein said first pair of magnets of said back panel being magnetically attachable to said keyhole grommets of said side panels adjacent said lower sides of said side panels, wherein said second pair of magnets of said back panel are magnetically attachable to said keyhole grommets of said side panels adjacent said upper sides of said side panels, and wherein said pair of magnets of said bottom panel are magnetically attachable to said keyhole grommets of said side panels adjacent said upper sides of said side panels.

5. The attachment of claim 1, wherein each of said side panels has a beveled lower corner adjacent the front end and lower side of the respective corner, said bottom panel having a pair of beveled corners adjacent said front side of said bottom panel.

6. An attachment for attaching to a tailgate pivotally coupled to a load bed of a vehicle, the load bed of the vehicle having an upwardly extending and spaced apart pair of side walls each having a tail light end positioned adjacent the tailgate, the attachment comprising:

a back panel being generally rectangular and having generally flat first and second faces, a generally straight pair of ends, and a generally straight pair of sides extending between said ends of said back panel;

said back panel having a length defined between said ends of said back panel and a width defined between said sides of said back panel, wherein said length of said panel is sized to extend across the width of a tailgate, wherein said width of said back panel is sized to extend across the distance between a load bed and the upper edges of the side walls of the load bed such that one of said sides of said back panel lies in a common plane with the upper edges of the side walls when said back panel is vertically resting on the tailgate;

a bottom panel being generally rectangular and having generally flat top and bottom faces, a generally straight pair of ends and a generally straight front and back sides extending between said ends of said bottom panel;

said bottom panel having a length defined between said ends of said bottom panel and a width defined between said front and back sides of said bottom panel;

wherein said length of said bottom panel is about equal to said length of said back panel, and wherein said width of said bottom panel is about equal to said width of said back panel a first side of said pair of sides of said back panel being pivotally coupled to said back side of said bottom panel, wherein a living hinge pivotally couples said first side of said back panel to said back side of said bottom panel;

each end of said back panel being associated with an end of said bottom panel, each pair of associated ends of said back and bottom panels generally lying in a common plane, said common planes of said pairs of associated ends of said back and bottom panels being generally parallel to one another;

said bottom face of said bottom panel being adapted for resting on a tailgate of a load bed of a vehicle such that said front side of said bottom panel is positioned towards the load bed of the vehicle, said back panel being pivotable between a lowered position and a raised position with respect to said bottom panel;

wherein said first face of said back panel is positioned adjacent said top face of said bottom panel such that said back panel and said bottom panel generally lie in parallel planes when said back panel is in said lowered position, wherein said back panel and the tailgate lie in generally parallel planes such that said back panel is in said lowered position and said bottom face of said bottom panel is resting on the tailgate;

wherein said back panel and said bottom panel generally lie in perpendicular planes when said back panel is in said raised position, wherein said back panel and the tailgate lie in generally perpendicular planes wherein said back panel is in said raised position and said bottom face of said bottom panel is resting on the tailgate;

first and second side panels, each side panel being generally rectangular and having generally flat inner and outer faces, generally straight front and back ends, and upper and lower sides extending between said front and back ends of the respective side panel;

said first and second side panels each having a length defined between the front and back ends of the respective side panel and a width defined between the upper and lower ends of the respective side panel;

wherein said lengths of said first and second side panels are generally equal to one another and said widths of said first and second side panels are generally equal to one another;

wherein said length of each of said side panels is greater than said width of said bottom panel, wherein the sum of said lengths of said side panels is less than about said length of said back panel;

said back end of said first side panel being pivotally coupled to a first end of said pair of ends of said back panel, said back end of said second side panel being pivotally coupled to a second end of said pair of ends of said back panel, wherein a living hinge pivotally couples each back end of said side panels to the associated end of said back panel;

said side panels being pivotable between a folded position and a deployed position, wherein side panels generally lie in parallel planes to said back panel when said side panels are in said folded position, wherein said side panels generally lie in perpendicular planes to said back panel when said side panels are in said deployed position;

said inner faces of said side panels generally facing one another when said side panels are in said deployed position, wherein said inner faces of said side panels generally face said first face of said back panel when said side panels are in said folded position;

each of said side panels being adapted for detachable attachment to an adjacent side wall of a vehicle when the tailgate of the vehicle is generally horizontal, said back panel is in said raised position, and said side panels are in said deployed position;

each of said side panels having a pair of keyhole grommets, each keyhole grommet having a keyhole through the respective side panel between said inner and outer faces of the respective side panel, said keyhole grommets each comprising a magnetizable metal material;

said keyhole grommets being positioned towards the front end of the respective side panel, one keyhole grommet of each side panel being positioned adjacent said upper side of the respective side panel, another keyhole grommet of each side panel being positioned adjacent said lower side of the respective side panel;

each keyhole grommet being adapted for extending a fastener therethrough for securing the side panels to the side walls of the vehicle, said fasteners being removable from said associated keyhole grommet to permit folding of said side panels to the folded position;

said first face of said back panel having first and second pairs of magnets, said first pair of magnets of said back panel being positioned towards said first side of said back panel, said second pair of magnets of said back panel being positioned towards a second side of said pair of sides of said back panel;

said top face of said bottom panel having a pair of magnets positioned adjacent said front side of said bottom panel;

said first pair of magnets of said back panel being magnetically attachable to said keyhole grommets of said side panels adjacent said lower sides of said side panels when said side panels are in said folded position to magnetically hold said side panels to said back panel;

said second pair of magnets of said back panel being magnetically attachable to said keyhole grommets of said side panels adjacent said upper sides of said side panels when said side panels are in said folded position to magnetically bold said side panels to said back panel;

said pair of magnets of said bottom panel being magnetically attachable to said keyhole grommets of said side panels adjacent said upper sides of said side panels when said side panels are in said folded position and said back panel is in said lowered position to magnetically hold said side panels to said bottom panel;

each of said side panels having a fold extending between said upper and lower sides of said respective side panel generally parallel to said front end of said respective side panel, said fold and front end of each of said side panels defining a flap region therebetween, said flap regions being pivotable along said associated fold with respect to the remainder of said respective side panel;

said flap regions being adapted for abutting against a pair of opposing mounting plates on the side walls of the vehicle to permit extension of said fasteners through said keyhole grommets and said mounting plates to secure said side panels to the side walls of the vehicle;

each of said side panels has a beveled lower corner adjacent the front end and lower side of the respective corner, said bottom panel having a pair of beveled corners adjacent said front side of said bottom panel, said beveled corners being for preventing items on the load bed from catching on the exposed corners of said side panels especially when removing items from the load bed; and said outer face of each of said side panels having a reflector thereon adjacent said back panel for providing visual identification of said side panels in low visibility conditions, said reflectors each having a generally rectangular configuration, wherein said reflectors are recessed into the outer face of the respective side panel such that said reflectors do not hinder folding of said side panels.

7. An attachment for attaching to a tailgate pivotally coupled to a load bed of a vehicle, the load bed of the vehicle having a pair of upwardly extending and spaced apart side walls each having a tail light end positioned adjacent the tailgate, the attachment comprising:

a back panel having first and second faces, a pair of ends, and a pair of sides extending between said ends of said back panel;

a bottom panel having top and bottom faces, a pair of ends and front and back sides extending between said ends of said bottom panel;

a first side of said pair of sides of said back panel being pivotally coupled to said back side of said bottom panel;

said bottom face of said bottom panel being adapted for resting on a tailgate of a load bed of a vehicle such that said front side of said bottom panel is positioned towards the load bed of the vehicle;

first and second side panels, each side panel having inner and outer faces, front and back ends, and upper and lower sides extending between said front and back ends of the respective side panel;

said back end of said first side panel being pivotally coupled to a first end of said pair of ends of said back panel, said back end of said second side panel being pivotally coupled to a second end of said pair of ends of said back panel;

each of said side panels being adapted for detachable attachment to an adjacent side wall of a vehicle when the tailgate of the vehicle is generally horizontal;

wherein each of said side panels has a pair of keyhole grommets, each keyhole grommet having a keyhole through the respective side panel between said inner and outer faces of the respective side panel, said keyhole grommets being positioned towards the front end of the respective side panel, one keyhole grommet of each side panel being positioned adjacent said upper side of the respective side panel, another keyhole grommet of each side panel being positioned adjacent said lower side of the respective side panel, each keyhole grommet being adapted for extending a fastener therethrough for securing the side panels to the side walls of the vehicle; and wherein said keyhole grommets each comprise a magnetizable metal material.

* * * * *